United States Patent [19]
Stevens et al.

[11] Patent Number: 6,167,437
[45] Date of Patent: *Dec. 26, 2000

[54] METHOD, SYSTEM, AND COMPUTER PROGRAM PRODUCT FOR PAGE REPLICATION IN A NON-UNIFORM MEMORY ACCESS SYSTEM

[75] Inventors: Luis F. Stevens, Milpitas; Bhanu Subramanya, San Jose, both of Calif.

[73] Assignee: Silicon Graphics, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/921,545

[22] Filed: Sep. 2, 1997

[51] Int. Cl.$^7$ .............................. G06F 15/167; G06F 5/17
[52] U.S. Cl. ......................... 709/214; 711/148; 711/165
[58] Field of Search .................... 395/200.42, 200.43, 395/200.44, 200.45, 200.46, 200.47, 200.48; 711/147, 148, 165; 709/212, 213, 214, 215, 216, 217, 218

[56] References Cited

U.S. PATENT DOCUMENTS

| | | | |
|---|---|---|---|
| 4,823,111 | 4/1989 | Tsuchiya et al. | 340/825.05 |
| 5,093,913 | 3/1992 | Bishop et al. | 711/170 |
| 5,161,156 | 11/1992 | Baum et al. | 371/7 |

(List continued on next page.)

OTHER PUBLICATIONS

Coulouris et al., *Distributed Systems: Concepts and Design*, Second Edition, Addison–Wesley Publishing, 1994.
Goodheart, B. and Cox, J., *The Magic Garden Explained: The Internals of UNIX System V Release 4, An Open Systems Design*, Prentice–Hall, 1994.
Hwang, K. *Advanced Computer Architecture: Parallelism, Scalability, Programmability*, McGraw–Hill, 1993.
Kumar et al., *Introduction to Parallel Computing*, Benjamin Cummings Publ., 1994, pp. v–xii and 29–48.
Coxeter, H.S.M., *Regular Polytopes*, 3$^{rd}$ Edition, Dover, 1973.
Catanzaro, *Multiprocessor System Architectures: A Technical Survey of Multiprocessor/Multithreaded Systems Using SPARC®, Multilevel Bus Architectures, and Solaris® (SunOS™)*, Sun Microsystems, Inc., 1994.
Lenoski, D. and Weber, W.D., *Scalable Shared–Memory Multiprocessing*, Morgan Kaufmann Publishers, 1995, pp. xi–xv, 1–40, 87–95, 143–203 and 311–316.
Hennessy and Patterson, *Computer Architecture: A Quantitative Approach*, Second Edition, pp. ix–xii and 634–760, Morgan and Kaufman Publishing, 1996.

(List continued on next page.)

*Primary Examiner*—Frank J. Asta
*Assistant Examiner*—Marc D. Thompson
*Attorney, Agent, or Firm*—Sterne, Kessler, Goldstein & Fox P.L.L.C.

[57] ABSTRACT

A system and method for page replication in a non-uniform memory access system (NUMA). The system and method generates replicas for memory objects to reduce contention and improve overall system performance in NUMA multiprocessor computer systems. Memory objects are used by the operating system to represent files, and comprise a state portion and a page cache portion. The state portion describes the state of the memory object. The page cache portion contains a set of physical memory pages that are currently being used to hold data belonging to the memory object. When a thread accesses data associated with a particular memory object for the first time, a check is made to determine if physical memory had already been allocated for the requested memory page. If a memory page is found, the memory object is interrogated to determine if the memory page is within a predetermined topological distance from the requesting node. If so, the memory page is mapped to the requesting process and it begins sharing the physical memory page. If the memory page is not within a predetermined topological distance from the requesting node, new physical memory is allocated and a replica is created that is located within the predetermined topological distance from the requesting node.

20 Claims, 10 Drawing Sheets

U.S. PATENT DOCUMENTS

| | | | |
|---|---|---|---|
| 5,228,127 | 7/1993 | Ikeda et al. | 395/200.55 |
| 5,237,673 | 8/1993 | Orbits et al. | 711/170 |
| 5,247,673 | 9/1993 | Costa et al. | 711/205 |
| 5,247,676 | 9/1993 | Ozur et al. | 395/650 |
| 5,261,097 | 11/1993 | Saxon | 395/650 |
| 5,269,013 | 12/1993 | Abramson et al. | 711/170 |
| 5,325,526 | 6/1994 | Cameron et al. | 395/672 |
| 5,345,588 | 9/1994 | Greenwood et al. | 395/650 |
| 5,349,664 | 9/1994 | Ikeda et al. | 395/652 |
| 5,430,850 | 7/1995 | Papadopoulos et al. | 395/375 |
| 5,490,274 | 2/1996 | Zbikowski et al. | 711/112 |
| 5,555,404 | 9/1996 | Torbjornsen et al. | 707/202 |
| 5,560,029 | 9/1996 | Papadopoulos et al. | 395/800 |
| 5,590,326 | 12/1996 | Manabe | 395/477 |
| 5,592,625 | 1/1997 | Sandberg | 395/200.08 |
| 5,692,193 | 11/1997 | Jagannathan et al. | 395/676 |
| 5,713,002 | 1/1998 | Zbikowski et al. | 711/112 |
| 5,717,926 | 2/1998 | Browning et al. | 395/674 |
| 5,727,150 | 3/1998 | Laudon et al. | 395/200.45 |
| 5,745,652 | 4/1998 | Bigus | 395/22 |
| 5,745,703 | 4/1998 | Cejtin et al. | 395/200.68 |
| 5,752,031 | 5/1998 | Cutler et al. | 395/673 |
| 5,761,505 | 6/1998 | Golson et al. | 395/653 |
| 5,771,383 | 6/1998 | Magee et al. | 395/680 |
| 5,784,697 | 7/1998 | Funk et al. | 711/170 |
| 5,805,593 | 9/1998 | Busche | 370/396 |
| 5,862,338 | 1/1999 | Walker et al. | 395/200.54 |
| 5,864,851 | 1/1999 | Breitbart et al. | 707/8 |
| 5,870,564 | 2/1999 | Jensen et al. | 395/200.71 |
| 5,911,149 | 6/1999 | Luan et al. | 711/147 |
| 5,958,010 | 9/1999 | Agarwal et al. | 709/224 |
| 5,974,536 | 10/1999 | Richardson | 712/215 |

OTHER PUBLICATIONS

"A Smaby Group Strategic Analysis: SGI/CRAY Link Up for the Next Challenge", Smaby Group, Inc., 1996, pp. 1–6, printed from http://www.smaby.com/sgicray.html on Apr. 16, 1997.

Chandra, R. et al., "Data Distribution Support on Distributed Shared Memory Multiprocessors", to appear in *Proceedings of the SIGPLAN 97 Conference on Programming Language Design and Implementation, Las Vegas, NV*, Jun. 1997.

Bolosky, William J. et al., "NUMA Policies and Their Relation to Memory Architecture,"*Proceedings of ASPLOS*, Apr. 1991, pp. 212–221.

Cox, Alan L. and Fowler, Robert J., "The Implementation of a Coherent Memory Abstraction on a NUMA Multiprocessor: Experiences with PLATINUM," *Proceedings of the Twelfth ACM Symposium on OPerating Systems Principles*, Dec. 3–6, 1989, pp. 32–44.

LaRowe, Richard P., Jr. and Ellis, Carla S., "Page Placement Policies for NUMA Multiprocessors," *Journal of Parallel and Distributed Computing*, vol. 11, No. 2, Feb. 1991, pp. 112–129.

COVERAGE RADIUS = 1

COVERAGE RADIUS = 3

HOT SPOT

METHOD, SYSTEM, AND COMPUTER PROGRAM PRODUCT FOR PAGE REPLICATION IN A NON-UNIFORM MEMORY ACCESS SYSTEM

BACKGROUND OF THE INVENTION

1. Field of the Invention

The present invention relates generally to allocation of memory in a computer system with distributed memory, and more particularly to replication of memory pages in a distributed, non-uniform memory access (NUMA) computer system.

2. Related Art

A distributed memory computer system typically includes a plurality of physically distinct and separated processing nodes. Each node has one or more processors, input output (I/O) devices and main memory that can be accessed by any of the processors. The main memory is physically distributed among the processing nodes. In other words, each processing node includes a portion of the main memory. Thus, each processor has access to "local" main memory (i.e., the portion of main memory that resides in the same processing node as the processor) and "remote" main memory (i.e., the portion of main memory that resides in other processing nodes).

For each processor, the latency associated with accessing local main memory is significantly less than the latency associated with accessing remote main memory. Further, for many NUMA systems, the latency associated with accessing remote memory increases as the topological distance between the node making a memory request and the node servicing the memory request increases. Accordingly, distributed memory computer systems as just described are said to represent non-uniform memory access (NUMA) computer systems.

In NUMA computer systems, it is desirable to store data in the portion of main memory that exists in the same processing node as the processor that most frequently accesses the data (or as close as possible to the processor that most frequently accesses the data). Accordingly, it may be desirable to replicate data to local processing nodes requesting data that resides in remote memory locations. By doing this, memory access latency is reduced and overall system performance is increased.

In addition, nodes in NUMA systems are interconnected via node links having a finite communication bandwidth. As such, large performance penalties are imposed when these links become overly congested with data traffic causing a decrease in the link bandwidth. This can occur, for example, when multiple processors attempt to access the same section of memory at the same time. This phenomenon is referred to as contention. A memory section that is simultaneously accessed by a large number of processors is referred to as a hotspot.

Memory replication can be used to alleviate the latency and link bandwidth problems as described above. Accordingly, data is replicated (i.e. copied) to portions of main memory that is closer to each of the processing nodes requesting the data. In this fashion, overall system performance is improved because further data accesses will be local rather than remote.

However, data replication in and of itself, can cause system problems and should not be made indiscriminately. For example, replicating large amounts of data can result in depleting the limited memory resources of the overall NUMA system. Accordingly, the benefits gained by replicating data need to be weighed against possible detrimental effects that can be caused by such replication. That is, the degree of replication needs to be monitored based on the current system state.

Thus, what is needed is an intelligent system and method for determining what pages to replicate, when to replicate pages and the degree of replication, given the current system resource state.

SUMMARY OF THE INVENTION

The present invention is directed toward a method, system, and computer program product for replicating memory pages in NUMA multi-processor computer systems in order to reduce contention and improve overall system performance. In a typical NUMA system, memory objects are used to store information pertaining to the physical allocation of memory pages in the system. Such memory objects are typically shared among all of the processing units within the NUMA system. When a process (also referred to herein as "thread"), attempts to access a memory page for the first time (or attempts to access any unmapped memory page), the present invention examines the memory object associated with the requested page. Specifically, in a preferred embodiment, the present invention determines whether or not physical memory for the requested page had already been allocated. This can occur, for example, if another thread previously requested the memory page being accessed.

Once it is determined that physical memory already exists for a requested memory page, the present invention determines whether to begin sharing that memory page, or whether to create a copy (i.e. a replica) of the memory page. In order to determine whether or not to create a replica, the present invention calculates the topological distance between the processing node that is requesting the data and the location of the physical memory page. If the topological distance is within a predetermined amount, the data is shared, and a replica is not created. If, on the other hand, the topological distance between the requesting node and the memory page is not within the predetermined amount, a replica is created. The predetermined amount is referred to herein as the "coverage radius" and is preferably stored within the memory object associated with the memory page.

Accordingly, a replica is created only if the requesting node is beyond the area of influence of the coverage radius, as specified by the memory object. Typically, replicas are created within or very near to a requesting node. The actual placement of the replica depends upon the placement procedures that are being used by a particular NUMA system.

In addition, the present invention dynamically and adaptively defines the degree of replication that is optimal for particular systems and system states. For example, in one embodiment, the areas of influence of memory objects are systematically increased when the overall system memory becomes low. This causes the NUMA system to produce fewer replicas and thereby conserve system memory.

In another embodiment, the area of influence for memory objects are dynamically adjusted, depending on the observed number of threads currently sharing a memory object. Generally, as the number of threads sharing a memory object increases, the possibility for contention also increases. Therefore, the coverage radius for the memory object is decreased so that more replicas are created. In this fashion the contention caused by hotspots are reduced.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention is described with reference to the accompanying drawings, wherein.

DETAILED DESCRIPTION OF THE PREFERRED EMBODIMENTS

The present invention provides a method, system, and computer program product for replicating memory pages in NUMA multi-processor computer systems in order to reduce contention and improve overall system performance. In an example embodiment, the present invention can be implemented as software in an IRIX™ or Cellular IRIX™ operating system executed by an Origin™ scalable, distributed shared-memory multi-processor platform, manufactured by Silicon Graphics, Inc., Mountain View, Calif.

In order to describe the present invention in detail, it is helpful to first discuss examples of a NUMA system, interconnection networks and an operating system environment. These examples are provided to assist in the description of page replication according to a preferred embodiment, and should not be construed to limit the scope and breadth of the present invention.

Example NUMA System

Figure 1A:
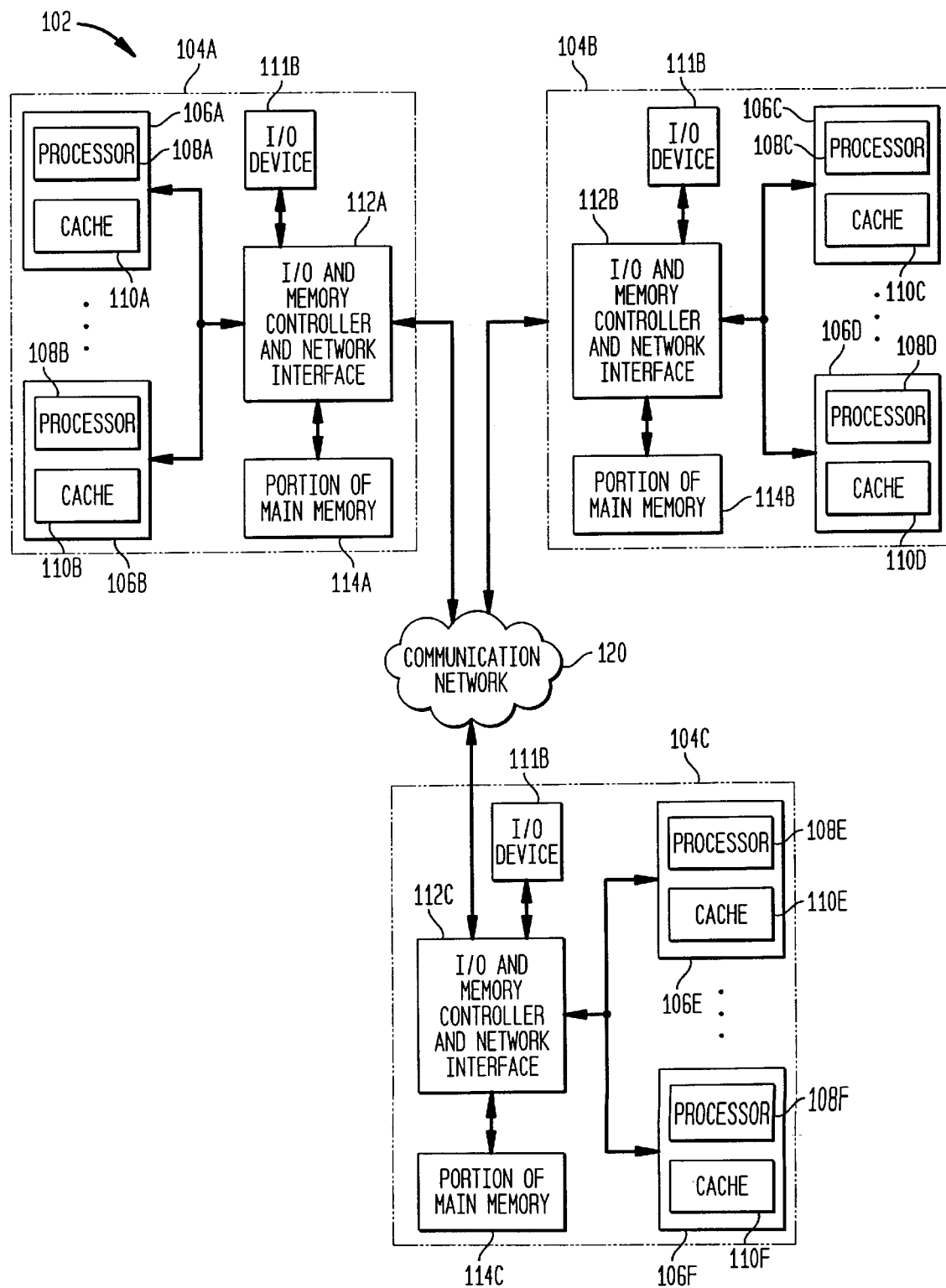
FIG. 1A is a block diagram of a non-uniform memory access (NUMA) computer system.
Figure 2A:
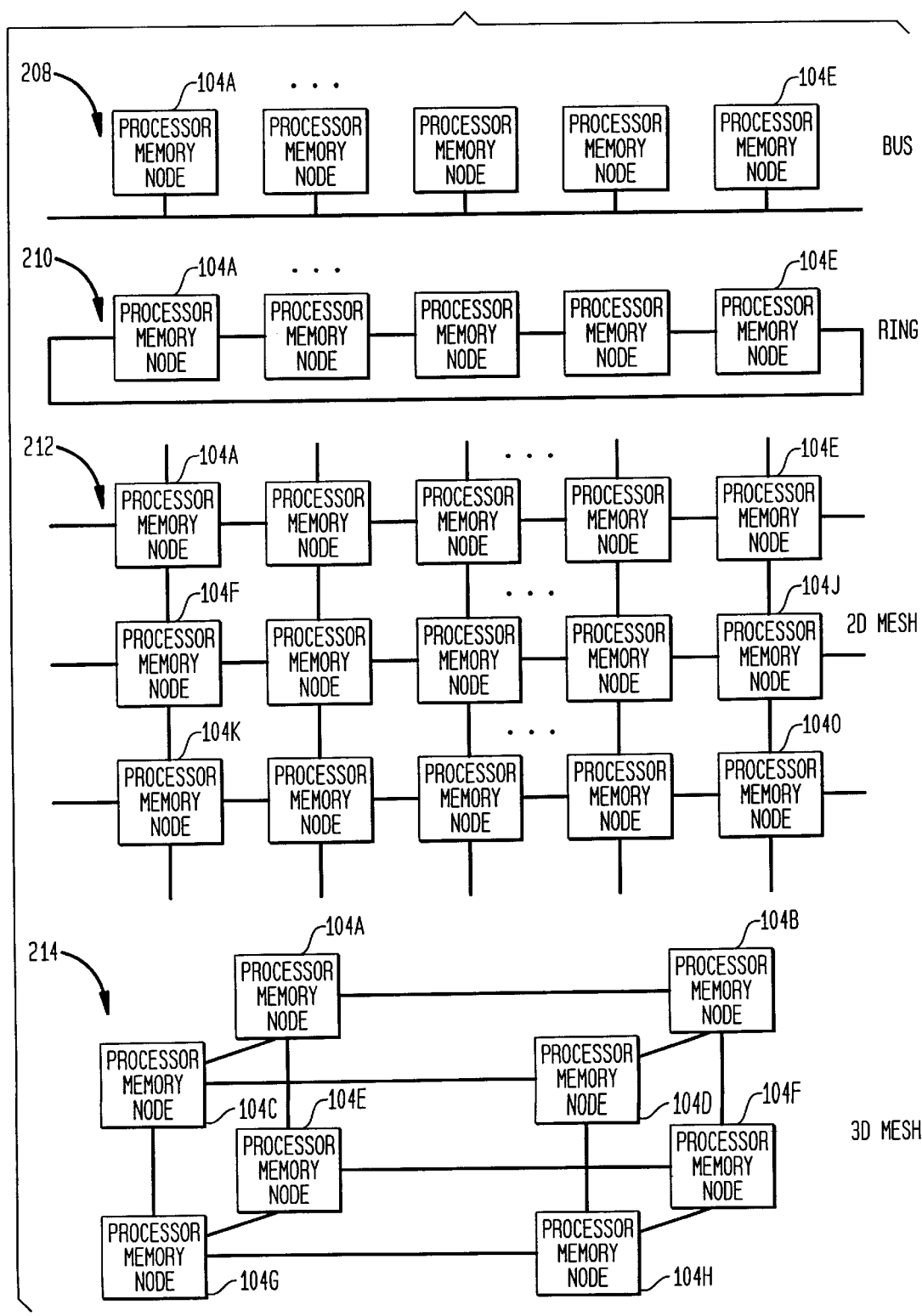
FIG. 2A is a block diagram depicting examples of common interconnection networks according to a preferred embodiment of the present invention.

FIG. 1A is a block diagram of a non-uniform memory access (NUMA) computer system 102. The computer system 102 includes a plurality of processing nodes 104A–104C, which are physically distinct and physically separated from one another. The processing nodes 104A–104C communicate with each other over a communication network 120, representing any well known data communication means, such as a bus, multistage interconnection network, local area network, wide area network, etc., or any combination thereof. Examples of common interconnection networks are depicted in FIG. 2A, and described below.

Each processing node 104 includes one or more computing nodes 106. Preferably, each processing node 104 includes two computing nodes 106, although each processing node 104 may alternatively include other numbers of computing nodes 106. Each computing node 106 includes a processor 108 and a cache 110. Each processing node 104 also includes a memory controller and network interface 112. The processors 108 in any particular processing node 104 communicate with other devices connected to the communication network 120 via the memory controller and network interface 112 contained in that processing node 104.

Each processing node 104 also includes a portion of main memory 114. The portions of main memory 114 in all of the processing nodes 104 collectively represent the main memory of the computer system 104. Any processor 108 in any processing node 104, can access data stored in the portion of main memory 114 contained in any of the processing nodes 104. Access to data contained in the portion of main memory 114 of any particular processing node 104 is controlled by the memory controller and network interface 112 contained in that same processing node 104.

Figure 1B:
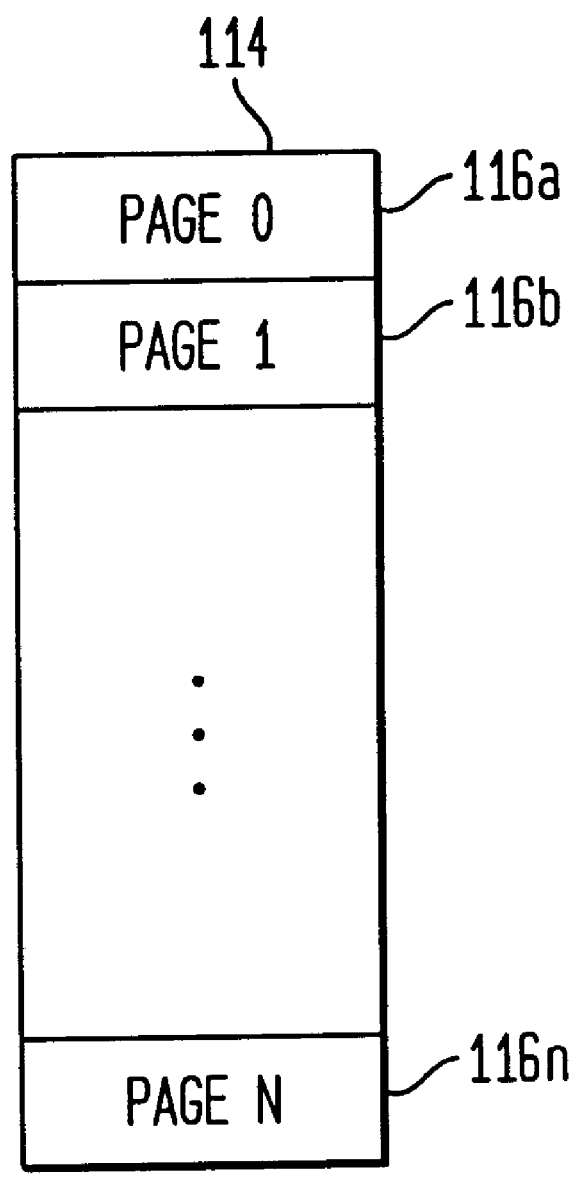
FIG. 1B is a block diagram of a portion of main memory.

FIG. 1B is a more detailed block diagram of a portion of main memory 114. Each portion of main memory 114 includes N memory pages 116a–116n (individually labeled page 0, page 1, ..., page N). Preferably, each memory page 116 is 16 Kbytes in size, although the present invention operates equally well with other memory page sizes and with varying memory page sizes. The value of N is implementation dependent. In some implementations the value of N is user selectable.

Example Interconnection Networks

FIG. 2A is a block diagram depicting examples of interconnection networks that can be used as the communication network 120, according to an embodiment of the present invention. FIG. 2A shows a bus system 208, a ring system 210, a 2D mesh system 212 and a 3D mesh system 214. The bus system 208 is used in many conventional computer systems. Using the bus system 208, the processor memory nodes 104A–E communicate to each other by broadcasting messages over the single shared bus. A disadvantage of using the bus system 208, is that the system is not scalable because the bus bandwidth does not increase as additional process or memory nodes 104 are added. In fact, adding processing nodes 104 to the bus system 208 causes a decrease the overall system bandwidth.

In contrast, the ring system 210, the 2D mesh system 212 and the 3D mesh system 214, all provide interconnections that are scalable. That is, adding process or memory nodes 104 to these systems causes an increase to the overall communication bandwidth of the network 120. It is important to note that the mesh networks 210, 212 and 214 have an additional characteristic in common. Specifically, the time it takes to communicate from one node 104 to another node 104, depends upon the topological distance between the nodes 104. That is, the further away one node is from another node, the longer it takes to communicate between the two. This is the reason such systems are referred to an non-uniform memory access systems.

To illustrate this characteristic, the following example is presented. In the following example, it is assumed that the communication time between adjacent nodes 104 is 100 nanoseconds (ηs.) in each of the networks depicted in FIG. 2A. Thus, for the ring topology network 210, a message from node 104A to node 104B takes exactly 100 ηs. However, a message from 104A to 104E takes 400 ηs. because it must first travel through the nodes 104B, 104C, and 104D.

Referring now to the 2D mesh 212, it can be seen that a message between the nodes 104A and 104O takes 600 ηs. It should be noted that alternate paths are available using this topology. In general, path redundancy is one of the advantages of using mesh network technology, such as the 2D 212 and the 3D 214 mesh networks. For example, communications between the nodes 104A and 104O can take the path—104A-104B-104C-104D-104E-104J-104O. Likewise, the alternate path—104A-104F-104K-104L-104M-104N-104O can also be used. As can be seen, there are many other possible paths that can be taken. In this fashion, alternate paths can be taken with other paths are blocked, out of service, congested, or otherwise unavailable.

Likewise, path redundancy exists in the 3D mesh technology, such as the 3D mesh 214. For example, the path 104A-104C-104D-104B can be used to send a message between nodes 104A and 104B. Note that using this path, the communication takes 300 ηs to complete. In contrast, by using a shorter path, (e.g. the path 104A–104B), it takes only 100 ηs. to complete the same communication.

Figure 2B:
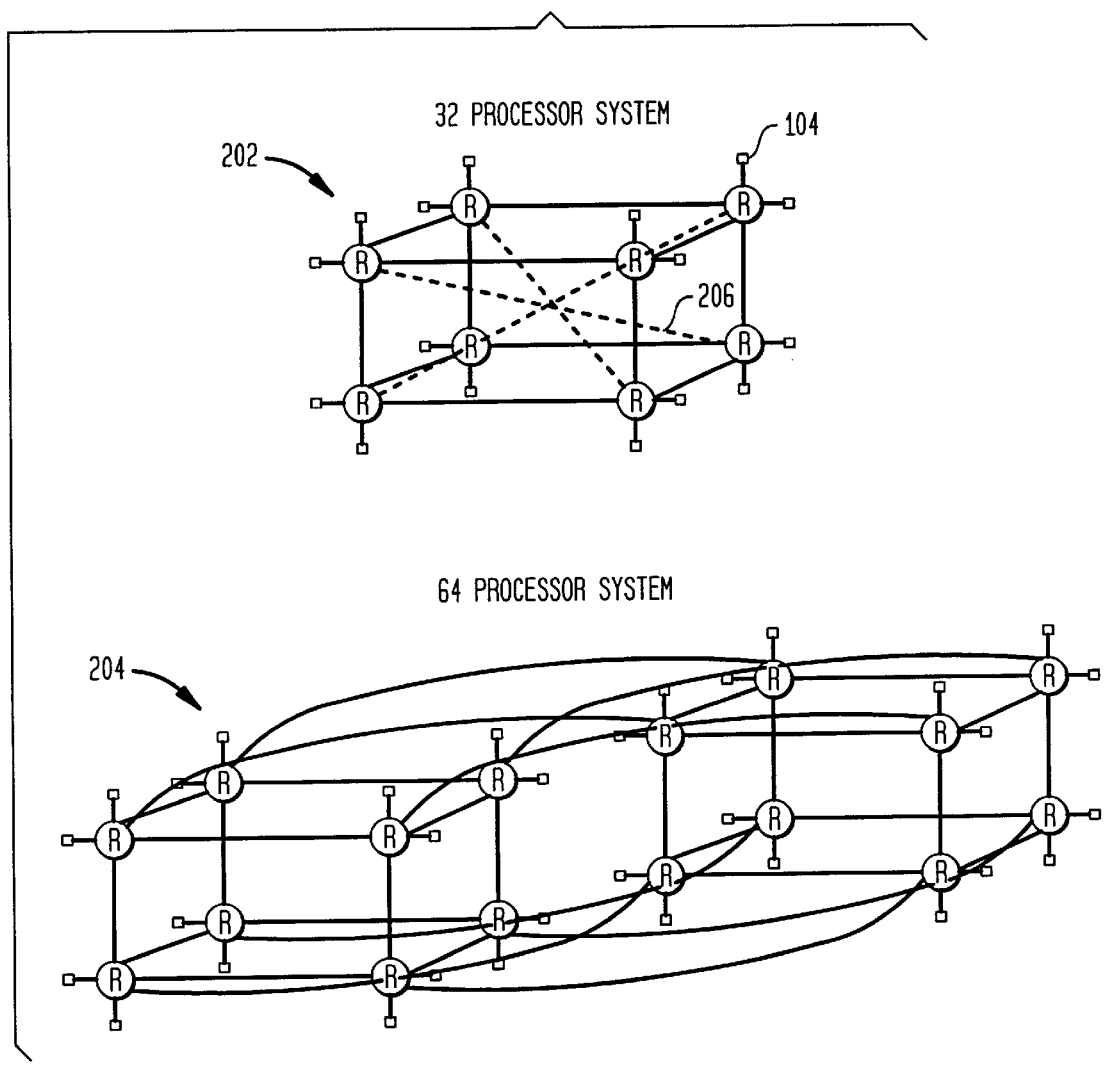
FIG. 2B depicts examples of multi-processor systems, according to a preferred embodiment of the present invention.

In a preferred embodiment of the present invention, 3D mesh topology 214 is used for the communication network 120. An example of a 32 and 64 processor system using 3D mesh topology is shown in FIG. 2B. In this example, a 32 processor system 202 comprises 16 nodes 104, each comprising 2 processors, such as the processor 106 (not shown in FIG. 2B). Note that in this example, additional links 206 are shown as dotted diagonal lines. These additional links serve to increase the node bandwidth and decrease system access latency by creating shorter paths between the nodes 104. An example of a 64 processor system 204 is also depicted in FIG. 2B.

As stated, the present invention operates in combination with a computer system having memory access times dependent upon the topological distance between a requestor node (or "local node") and a server node (or "remote mode"). In the examples used herein, the topological distance is described in terms of the number of "hops" between the nodes. For example, referring back to FIG. 2A, the shortest topological distance between the nodes 104A and 104K, in the 2D mesh topology 212, is 2 hops (i.e. the path—104A-104F-104K). Likewise the topological distance between the nodes 104A and 104F is 1 hop. When memory is being accessed locally, within a single node, the topological distance is referred to herein as being 0 hops.

Note that the present invention can be implemented using a variety of network topologies including those discussed herein, and others not specifically mentioned. However, the definition of the topological distance between nodes in any NUMA system will be apparent to those skilled in the relevant art(s). The topologies of a bus system, ring system, and 2D and 3D meshes are used herein for exemplary purposes only and should not be construed to limit the scope and breadth of the present invention.

Example Operating System Environment

Figure 3:
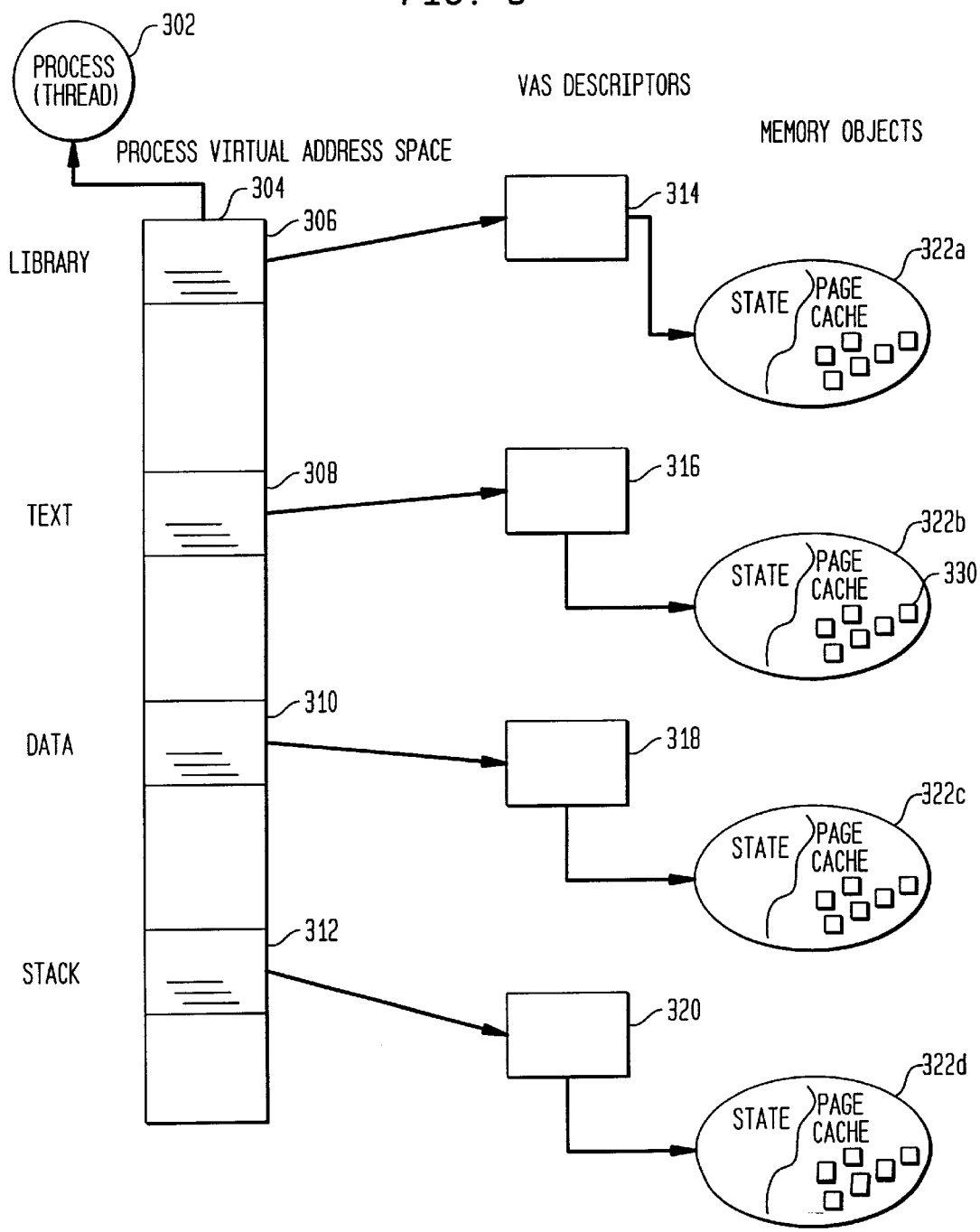
FIG. 3 is a block diagram depicting an operating system mechanism that is useful for describing the operation of the present invention.

FIG. 3 is a block diagram depicting an operating system mechanism that is useful for describing the operation of the system and method of the present invention. Specifically, FIG. 3 represents a mechanism used to manage main memory during fault processing. In general, a fault occurs whenever a thread attempts to access a memory page that has no corresponding valid page-table entry. When this happens, the following mechanism can used to resolve the fault and map the memory page for the thread.

FIG. 3 depicts a single thread 302 and its associated virtual address space 304. The virtual address space 304 is divided into sections. Specifically, in this example, the virtual address space 304 is divided into a library section 306, a text section 308, a data section 310 and a stack section 312.

Each section of the virtual address space 304 points to a virtual address space descriptor (VAS descriptor), which in turn, points to a memory object. Specifically, the library section 304 points to the VAS descriptor 314, which points to the memory object 322a. Likewise, the text section 308 points to the VAS descriptor 316, which points to the memory object 322b. Similarly, the data section 310 points to the VAS descriptor 318, which points to the memory object 322c. In addition, the stack section 312 points to the VAS descriptor 320, which points to the memory object 322d.

As the name indicates, the VAS descriptor serves to store information that is descriptive of the associated virtual address space. The function of the VAS descriptors 314, 316, 318 and 320 are not relevant to the system and method of the present invention, and are not further described herein. It is sufficient to note that each section 306, 308, 310 and 312 of virtual address space 304, has a specific memory object associated with it (322a, 322b, 322c and 322d, respectively). As described below, the memory objects 322 are used by the operating system to manage and share physical memory among threads 302.

The library section 306 typically contains library functions that are used by the thread 302. In this example, only one library section 306 is depicted for simplicity, but it is well understood that multiple libraries can be associated with each thread 302. Typically, libraries are used by the thread 302 to perform standard operations such as input/output, dynamic memory allocation, data parsing and the like.

The text section 308 represents application program code associated with the thread 302. The data section 310 represents virtual addresses where data will be allocated during the thread's execution. The stack section 312, represents the area for the program stack that is used by the thread 302 during execution.

The general function of fault processing will now be described with reference to FIG. 3. This function will be described with respect to the text section 308, but also applies to the other sections of the virtual address space 304. As stated, the text portion 308 of the virtual address space 304 is used by the thread 302 to reference the program code. Generally, the program code associated with the thread 302 is embodied in a named file that resides on a disk (not shown). For example, the UNIX shell is a program that is typically embodied in a named file referred to as "/bin/sh".

Accordingly, whenever a thread, such as the thread 302, references one or more functions or methods within the UNIX shell for the first time, the operating system generates a fault. This indicates that certain portions of text may need to be read from the named file (namely, "/bin/sh"), and stored into main memory. If so, the operating system allocates a portion of main memory and then stores the data from a disk into the newly allocated portion of main memory. Generally, this process occurs on a page by page basis. The size of each data page is typically dependent on the specific implementation of the present invention. A typical size for a data page is 16 Kbytes. In some embodiments, the data page size is selectable by the application program developer.

Once a memory page is allocated, the operating system provides the physical address to the faulting thread, such as the thread 302. The thread 302 then maps this physical address to the virtual address within the virtual address space 304. This is referred to as herein as "mapping".

Thus, whenever any thread, such as the thread 302, references an area of its virtual address space 304 that is unmapped, a fault is generated by the operating system and a mapping occurs. Note however, that in a multi-processing system, a fault does not necessarily result in data being read from disk. Instead, such systems typically check to see if the memory page is already in main memory. This can happen for example, if another thread previously read-in the data page from disk. Accordingly, if a copy of data is already in main memory, the faulting thread can simply map to the existing memory page. In this fashion, the much slower process of allocating a data page, reading the data page from disk, and storing it into the newly allocated memory page can be avoided.

However, if the fault results in the allocation of a new memory page, the memory object 322b is updated. Specifically, the page cache portion of the memory object 322b is updated with a new entry, such as the entry 330. The new entry 330 represents the newly allocated memory page. Accordingly, whenever any thread within the system subsequently generates a fault associated with the memory page entry 330, the memory object 322b is examined to determine if a physical memory page already exists, as described above. Each entry 330 can point to a single physical memory page, or a list of memory pages (if replicas exist).

Note however, as previously mentioned, it is not always advantageous for a thread running in one node 104, to share an already existing copy of a memory page in another node 104. Recall that the latency associated with accessing remote memory is significantly greater than the latency associated with accessing local memory. Further, the latency associated with memory access increases as the distance between the requesting node and the node associated with the requested memory page increases. As such, if an already existing copy of a memory page is not very close to the faulting node, it can be advantageous to replicate the memory page to a node that is closer or local to the faulting node. Accordingly, the present invention introduces a concept referred to as a "coverage radius". As described below, the coverage radius is used to determine when memory pages should be replicated.

Intelligent Page Replication

Figure 4:
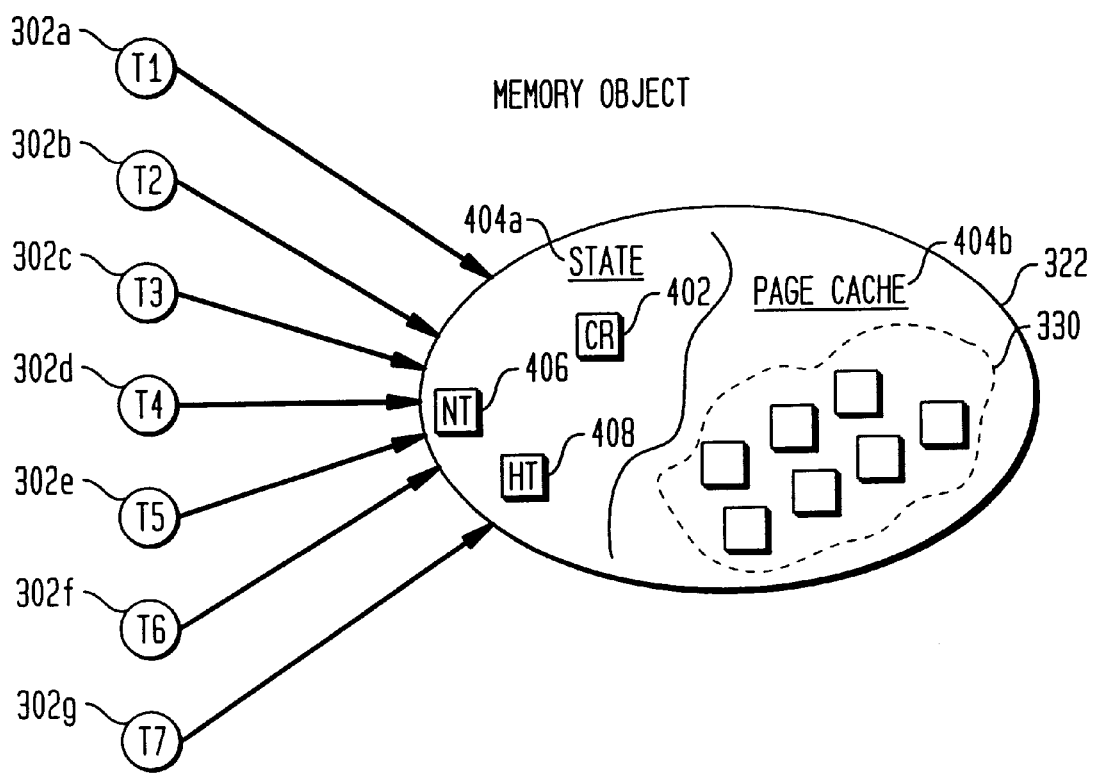
FIG. 4 is a block diagram of a memory object according to a preferred embodiment of the present invention.

Referring now to FIG. 4, in the example embodiment, each memory object 322 be referenced by multiple threads 302a–303g. Thus, when any single thread 302 attempts to access a memory page that is not mapped, the memory object 322 associated with the memory page is examined to determine whether a memory page already exists in physical memory.

In this example of a preferred embodiment, the memory object 322 comprises a "state" portion 404a and a "page cache" portion 404b. The state portion 404a comprises information pertaining to the memory object such as the size, the read/write status and the number of threads currently referencing the memory object, denoted in FIG. 4 as the "number of threads" variable "NT" 406. The state portion 404a also comprises a hash table ("HT") 408, that is used as an index for searching the page entries 330 within the page cache portion 404b of the memory object 322. In addition, the state portion 404a of the memory object 322 also includes a coverage radius ("CR") 402. As stated, the coverage radius 402 is used to determine whether or not to replicate a memory page. Accordingly, if an existing memory page is within the area of influence as specified by the coverage radius 402, the memory page is shared and a replica is not created. However, if the coverage radius 402 indicates that the existing memory page is not within the area of influence, a copy (replica) of the memory page is made to a node that is within the coverage radius 402.

Figure 5:
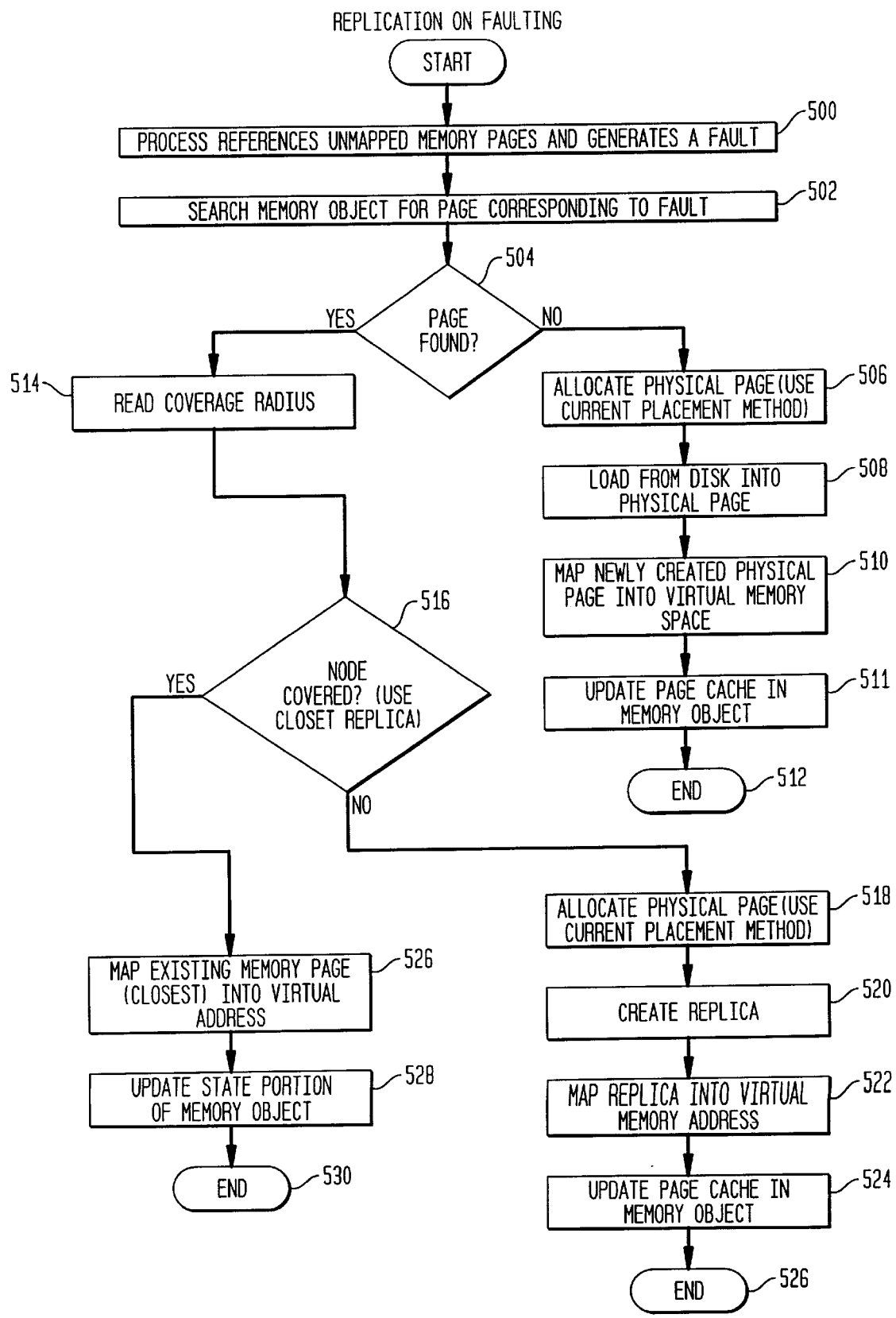
FIG. 5 is a flowchart depicting the operation of a process that performs replication according to a preferred embodiment of the present invention.

FIG. 5 is a flowchart depicting an example of a process for fault handling that is useful for describing memory replication according to a preferred embodiment of the present invention. In the following example, a fault is generated by the operating system following a reference to an unmapped memory page, as described above. It is assumed that the unmapped memory page in this example is associated with a named file on disk. Specifically it is assumed that the fault is generated in response to a referenced memory page within the text portion 308 of the virtual address space 304, as previously described.

The process begins with step 500. In step 500 the thread 302 references an unmapped memory page. This causes a fault to be generated by the operating system. After the fault is generated in step 500, control passes to step 502.

In step 502 a memory object, such as the memory object 322b, is searched for a page corresponding to fault. In particular, the memory object 322 associated with the virtual address space referenced in step 500 is interrogated. In a preferred embodiment, the hash table 408 is used to determine if a page entry 330 (corresponding to the referenced page) is stored in the page cache portion 404b of the memory object 322.

In step 504, if a page entry 330 is found, then a physical memory page already exists within the NUMA system and processing continues with steps 514 as described below.

However, as indicated by step 504, if a page entry is not found, control passes to step 506. In step 506, a physical memory page is allocated in main memory. The location of the physical memory page depends upon the placement procedures used by the specific implementation of the present invention. Preferably, in order to reduce latency associated with accessing the new memory page, it is placed near or within the processing node 104 that generates the fault in step 500 (i.e the "requesting node"). Once a memory page is allocated control passes to step 508.

In step 508, the data page is read from the associated named file on disk and stored in the memory page allocated in step 506. In step 510, the physical memory page allocated in step 506 is mapped to the virtual memory address referenced in step 500. The process ends with step 512.

Referring back to step 504, if a page is found in the page cache portion of the memory object 322 control passes to step 514. As stated, this indicates that at least one physical memory page already exists within the NUMA system. Accordingly, in step 514 the coverage radius 324 is read from the memory object 322.

Once the presence of an existing physical memory page is determined, the coverage radius 402 is used to determine whether the faulting thread should share the existing memory page, or alternatively, whether a replica should be created. This determination is made based upon the coverage radius 402 and the topological distance between the requesting node and node in which the existing memory page is stored.

It is important to note that more than one copy of the memory page can exist in memory. This can occur, for example, if replicas have already been created for the requested memory page. If more than one copy of any memory page exists, the entry 330 corresponding to that memory page contains a list comprising all copies of the memory page within the NUMA system. Accordingly, the determination of whether the requesting node is covered, as illustrated in step 516, is made with respect to the copy of the existing memory page that is closest to the requesting node.

Accordingly, if the topological distance between the existing memory page and the requesting node is within the area of influence specified by the coverage radius 402, the memory page is shared. Conversely, if the topological distance between the existing memory page and the requesting node is not within the area of influence specified by the coverage radius 402, a replica of the memory page is created. If a replica is created, it is placed within a node 104 that is within, or as close as possible to the requesting node. In this manner, the latency associated with accessing the memory page is reduced. However, the placement of the replica depends on the placement policies and procedures of a specific implementation of the present invention.

Thus, as step 504 indicates, a determination is made as to whether the requesting node is "covered" by the existing memory page. If the requesting node is covered, the thread 302 begins sharing the existing memory page as indicated by steps 526–530 (described below). Alternatively, if the requesting node is not covered, the process creates a replica for the requested memory page, as indicated by steps 518–526 (described below).

Figure 6A:
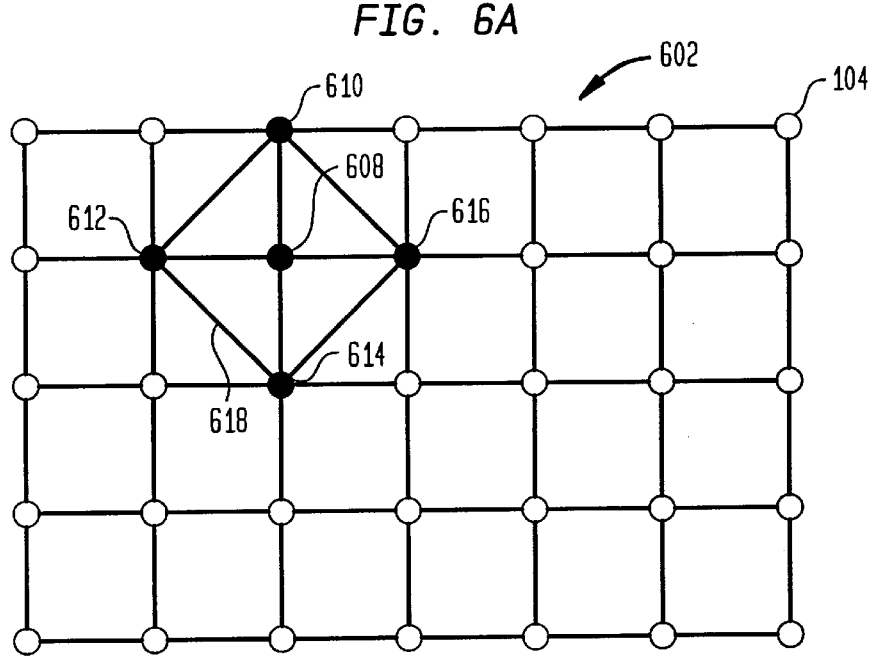
FIGS. 6A and 6B depict two examples of areas of influence according to specified coverage radii, according to a preferred embodiment of the present invention.
Figure 6B:
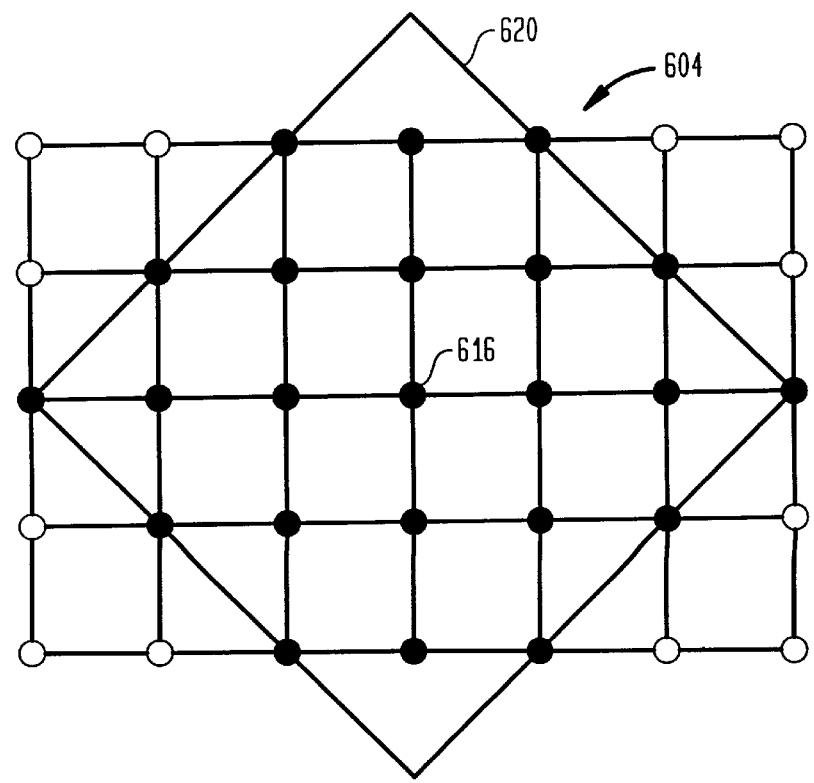

Before describing the details of the remaining process steps in FIG. 5, the coverage radius 402 and its area of influence will now be described in detail with reference to FIGS. 6A and 6B. FIGS. 6A and 6B depict two examples of mesh networks, such as the 2D mesh network 212, as previously described. Note that this type of network topology is used for exemplary purposes only and should not be construed to limit the scope of the present invention which is applicable to any network topology used in any NUMA system. In this example, each circle represents a single node 104. Thus, as can be seen, the mesh networks 602 and 604 each comprise 35 nodes.

Referring now to FIG. 6A, the network 602 graphically depicts the area of influence 618 associated with a memory page having a coverage radius 402 of 1. The memory page under consideration in this example is stored in the node 608. Accordingly, the area of influence (depicted by the square 618), comprises all nodes within a topological distance of 1 hop from node 608. Accordingly, because the coverage radius=1, the area of influence comprises all of the nodes within a topological distance of 1 hop from node 618. Specifically, the area of influence includes the nodes 608, 610, 612, 614, 616 and 618. Thus, a requesting node is said to be covered if it is within the area of influence 618.

Recall that if a requesting node is covered, a replica is not created and the existing memory page is shared with the requesting thread. Alternatively, if a requesting node is outside of the area of influence, a replica is created. Therefore, systematically, the degree or frequency of replication is inversely proportional to the coverage radius 402. This can be represented mathematically as:

$$DR \propto \frac{1}{CR} \qquad \text{Equation 1}$$

where DR=Degree of Replication and CR=Coverage Radius 402.

The network 604 graphically depicts the area of influence caused by a memory page in node 616 having a coverage radius=3. Accordingly, the area of influence 620 comprises all nodes within a topological distance of 3 hops from the memory node 616. These nodes are depicted as the shaded circles in FIG. 6B.

Referring back to FIG. 5, the process step 516 determines whether the requesting node is covered. That is, in step 516 it is determined whether the requesting node is within the area of influence of the existing memory page, according to the coverage radius 402. Simply put, this is determined by taking the shortest path between the requesting node and the existing memory page, and counting the number of hops it takes to get from one node to the other. If the number of hops is less than or equal to the coverage radius 402, then the requesting node is covered by the memory page and control passes to step 526.

Alternatively, if the number of hops between the two nodes is more than the coverage radius 402, the requesting node is not covered and a replica is created. Accordingly, control passes to step 518, where a physical memory page is allocated for the replica. The location of the physical memory page depends upon the placement procedures used by the specific implementation of the present invention. Preferably, the replica is allocated in a memory page that is near or within the requesting node. In any case, the replica is created in a node such that the requesting node is covered by the replica according to the coverage area radius 402. That is, the requesting node is within the area of influence of the newly created replica.

Next, in step 520, a replica is created by copying the memory page from the existing memory page into the newly allocated memory page. In step 522, the newly allocated replica is mapped to the virtual address from step 500.

Next, in step 524, the page cache portion 404b of the memory object 322 is updated. Specifically, a new entry, such as the entry 330, is added to the memory object 322 that refers to the newly created replica. As stated, each page entry 330 may comprise a single memory page or a list of memory pages that are replicas of one another. In this fashion, when a determination is made as to whether to create a replica, it selects the memory page from the list of replicas that is closest to the requesting node (see step 516 above). Once the page cache portion 404b of the memory object 322 is updated, the process ends as indicated by step 526.

Referring back to step 516, if it is determined that the requesting node is covered by the existing memory page, then the existing memory page is shared with the thread 302 in the requesting node. Accordingly, as indicated by step 526, the physical memory page is mapped to the virtual address from step 500. As stated, the physical memory page that is closest to the requesting node (i.e. the page used in the decision step 516), is shared in step 526.

Next, in step 526, the state portion 404a of the memory object 322 is updated. Specifically, the number of threads variable NT 406 is incremented by 1. This reflects the fact that a new thread 302 is now sharing a page in the memory object 322. Once the memory object is updated, the process ends as indicated by step 530.

The system and method of the present invention provides a means to dynamically alter the degree of replication based on the state of the NUMA system. Specifically, in a preferred embodiment, the coverage radius 402 is dynamically adjusted depending on the following two factors: (1) the presence of hotspots; and (2) the amount of physical memory available in the NUMA system. This aspect of the present invention is described in detail below.

In general, system performance decreases as the number of threads sharing a particular memory object 322 increases. This phenomenon occurs because of an increase in contention among multiple threads 302 sharing a common portion of main memory. As stated, this condition is referred to as a hotspot.

Figure 7:
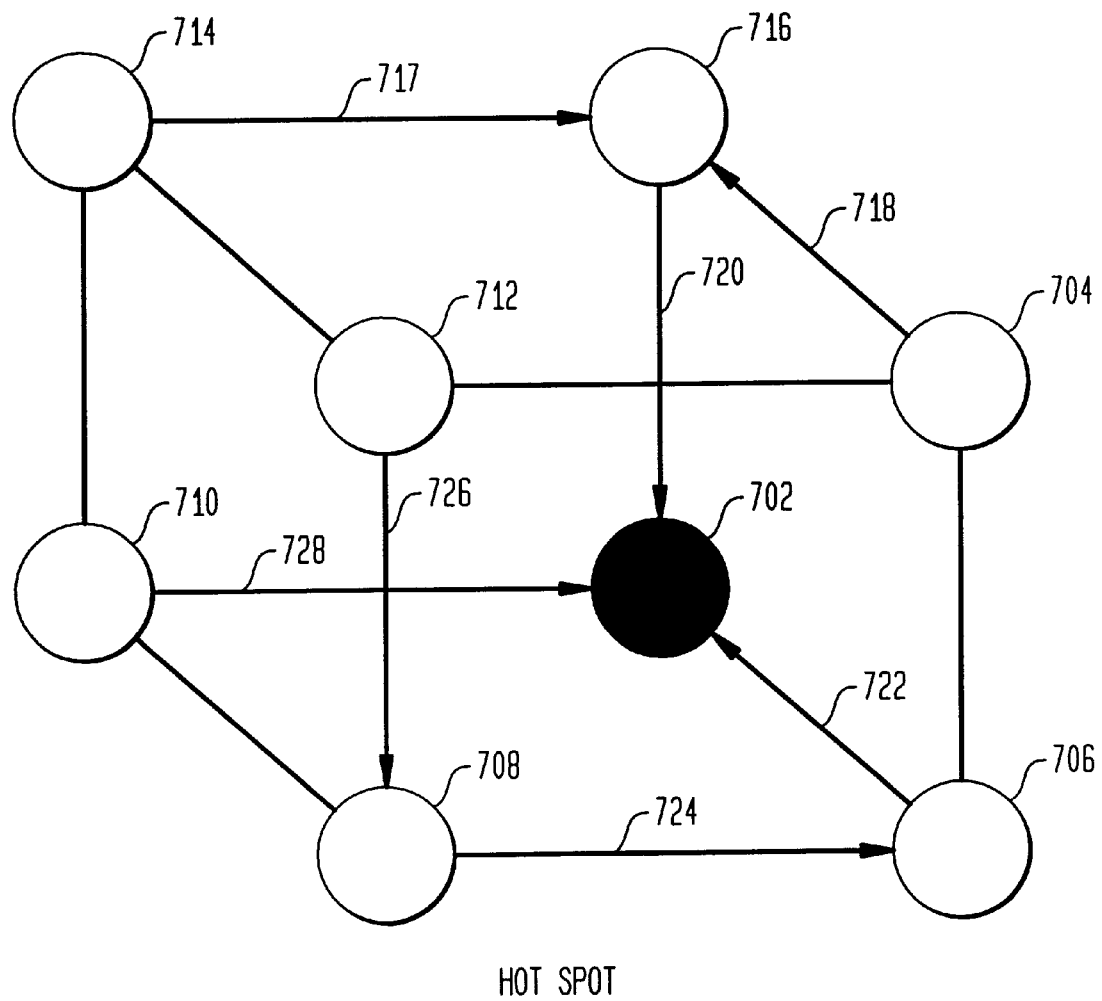
FIG. 7 depicts a hotspot that is useful for describing the controlling aspects of the degree of replication, according to a preferred embodiment of the present invention.

An example of a hotspot is shown in FIG. 7. In FIG. 7, a hotspot is said to exist in node 702 because memory within the node 702 is simultaneously accessed by several threads 302. The hotspot node 702 in this example is being accessed by the threads 302 running in the nodes 704, 706, 708, 710, 712, 714 and 716. The arrows depicted in FIG. 7, illustrate, for exemplary purposes, the paths taken by each requesting node 704–716 to access memory in the hotspot node 702.

For example, the node 714 accesses memory in the hotspot node 702, via the path 717–720. Similarly, the node 716 access memory in the node 702, via the path 720. In a like fashion, the node 704 access memory in the node 702, via the path 718–720. Thus, the link 720 is used by each of the nodes 714, 716 and 704 to access memory from node 702. Because of the limited bandwidth of the interconnecting links, (specifically the link 720), delays are introduced so that the system can handle the simultaneous requests. For example, suppose the link 720 has the capacity or bandwidth to carry two simultaneous requests. In this case, a delay is introduced so that the third request is delayed until additional bandwidth is available in the link 720.

Accordingly, the present invention provides a means to reduce such delays caused by hotspots. This is accomplished by increasing the degree of replication for memory pages that are stored in hotspot nodes, such as the hotspot node 702. In a preferred embodiment, this is accomplished by dynamically adjusting the coverage radius 402 according to the observed number of threads 406 referencing the memory object 322. For example, it can be seen in FIG. 4 that 7 threads 302a–302g are currently referencing the memory object 322. As stated, in a preferred embodiment, the observed number of threads referencing a memory object 322 at any point in time is stored in the variable NT 406. Thus, the dynamic adjustment of the coverage radius based on the number of referenced threads can be expressed mathematically as follows:

$$CR_n = CR_c - \beta(NT) \quad \text{Equation 2}$$

where $CR_n$ is the new Coverage Radius 402 to be stored in the memory object 322, $CR_c$ is the current coverage radius 402 stored in the memory object 322, and $\beta$ is a function that depends on the number of threads (i.e. the variable NT 406).

Thus, as NT 406 increases, the CR 402 is decreased, thereby causing more replications to take place and avoid hotspot conditions. In a preferred embodiment, the function $\beta$ is implemented with a threshold based table. For example, if the number of threads (NT 406) exceeds a predetermined threshold, $\beta$ increases. An example of such a threshold table is as follows:

TABLE 1

| Number of Treads | β |
|---|---|
| 0–5 | 0 |
| 5–9 | 1 |
| 10–19 | 2 |
| 20 and over | 4 |

The second means to dynamically alter the degree of replication provided by the present invention is based the amount of free physical memory available in the NUMA system. Because memory replication uses available free memory to store the replicated data, the benefits gained by replicating should be weighed against possible detrimental effects caused by using memory resources. Generally, when physical memory becomes critically low, large performance penalties are incurred because physical memory is swapped out to disk pursuant to virtual memory schemes. Accordingly, the present invention provides a means to avoid such performance penalties by reducing, on a system level, the degree of replication when system memory resources become low.

Specifically, the present invention provides a means to dynamically adjust the degree of replication based on the amount of physical memory available in the NUMA system. This is accomplished by dynamically adjusting the coverage radius 402 according to the "memory pressure." Memory pressure refers to the overall available memory in the NUMA system. Memory pressure increases as the available memory decreases. Accordingly, as memory pressure increases, replication on a system level decreases. This is accomplished by increasing the coverage radius 402 of all memory objects systematically, as memory pressure increases. Thus, the dynamic adjustment of the coverage radius based on the memory pressure can be expressed mathematically as follows:

$$CR_n = CR_c + \phi(\text{memory pressure}) \quad \text{Equation 3}$$

where $CR_n$ is the new Coverage Radius 402, $CR_c$ is the current Coverage Radius 402 and $\phi$ is a function that depends on the memory pressure.

Thus, as memory pressure increases (i.e. free system memory decreases), the CR 402 is increased, thereby causing fewer replications to take place in order to avoid low memory conditions. In a preferred embodiment, the function $\phi$ is implemented with a simple threshold based table. For example, if the amount of free physical memory goes below a predetermined level, then $\phi$ increases. An example of such a threshold table is as follows:

TABLE 2

| Amount of Free Memory | φ |
|---|---|
| >31% | 0 |
| 20%–30% | 2 |
| 6%–19% | 4 |
| 5% or less | X |

The number X in the above table is selected so that zero replications are performed system-wide. That is, if the available system memory becomes less than 5% of the total system memory, the number X is selected so that the CR 402 in Equation 3 is sufficiently large so that it's area of influence covers all nodes in the NUMA system. In this fashion, replications will not take place until additional memory becomes available.

Thus, combining equations 2 and 3 above, we have a mathematical expression that represents the overall dynamic adjustment of the coverage radius according to a preferred embodiment of the present invention, as shown below in equation 4.

$$CR_n = CR_c - \beta(NT) + \phi(\text{memory pressure}) \quad \text{Equation 4}$$

Note that in a typical implementation of the present invention, whenever the Coverage Radius 402 is increased, due to increased hotspots, memory pressure or the like, procedures are executed in order to enforce the new Coverage Radius. For example, to conform with an increased Coverage Radius, a replica shoot-down procedure is executed to remove pre-existing replicas and thereby recover additional memory. In this fashion, replica usage is adjusted on a system-wide level in order to comply with the new Coverage Radius. Specific methods and procedures that can be used to remove replicas in this fashion would be apparent to persons skilled in the relevant art(s).

Figure 8:
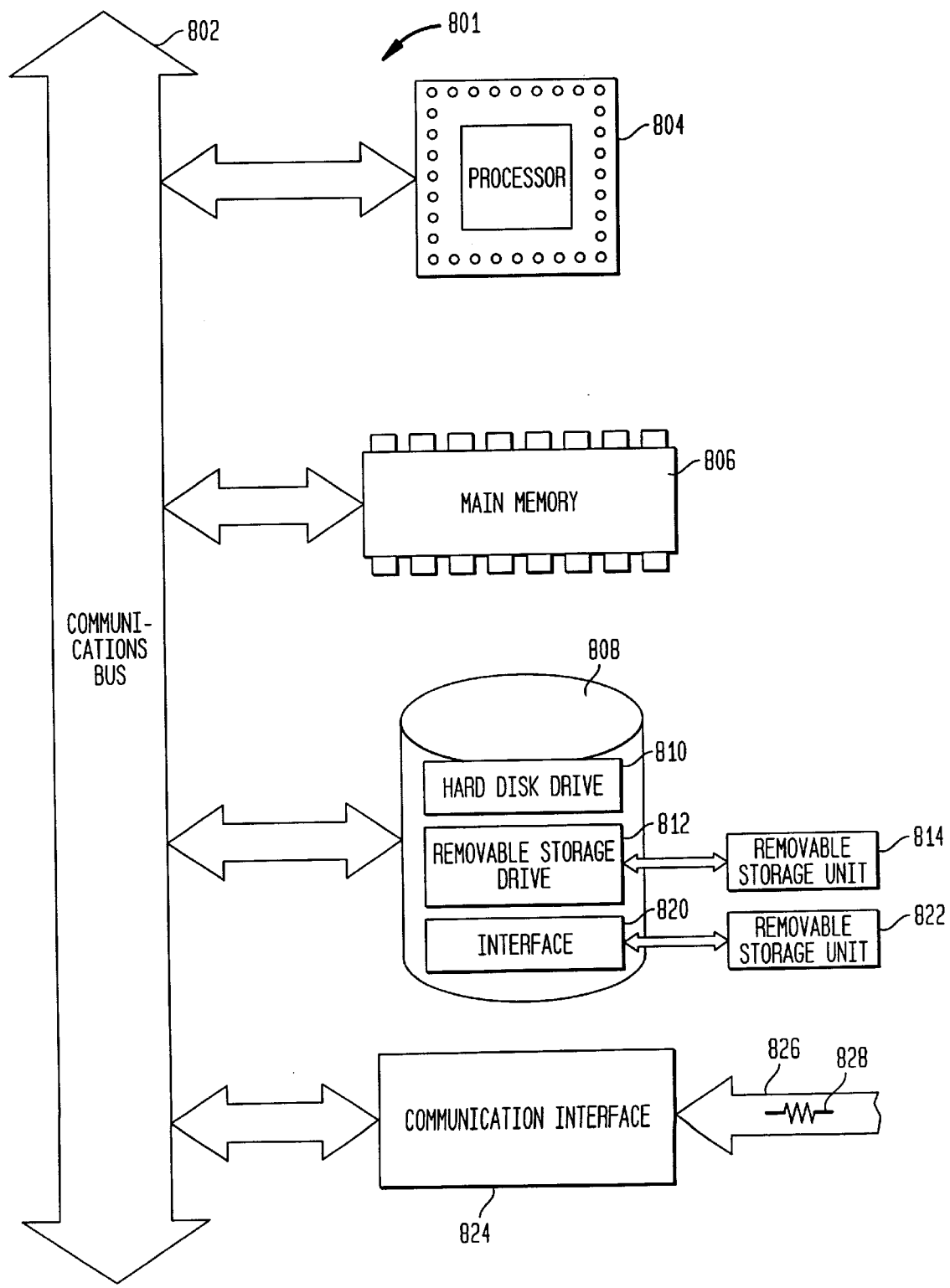
FIG. 8 is a block diagram of a computer that can be used to implement components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 801 is shown in FIG. 8. The computer system 801 includes one or more processors, such as processor 804. The processor 804 is connected to a communication bus 802. Various software embodiments are described in terms of this example computer system. After reading this description, it will become apparent to a person skilled in the relevant art how to implement the invention using other computer systems and/or computer architectures.

Computer system 802 also includes a main memory 806, preferably random access memory (RAM), and can also include a secondary memory 808. The secondary memory 808 can include, for example, a hard disk drive 810 and/or a removable storage drive 812, representing a floppy disk drive, a magnetic tape drive, an optical disk drive, etc. The removable storage drive 812 reads from and/or writes to a removable storage unit 814 in a well known manner. Removable storage unit 814, represents a floppy disk, magnetic tape, optical disk, etc. which is read by and written to by removable storage drive 812. As will be appreciated, the removable storage unit 814 includes a computer usable storage medium having stored therein computer software and/or data.

In alternative embodiments, secondary memory 808 may include other similar means for allowing computer programs or other instructions to be loaded into computer system 801. Such means can include, for example, a removable storage unit 822 and an interface 820. Examples of such can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 801.

Computer system 801 can also include a communications interface 824. Communications interface 824 allows software and data to be transferred between computer system 801 and external devices. Examples of communications interface 824 can include a modem, a network interface (such as an Ethernet card), a communications port, a PCM-CIA slot and card, etc. Software and data transferred via communications interface 824 are in the form of signals which can be electronic, electromagnetic, optical or other signals capable of being received by communications interface 824. These signals 826 are provided to communications interface via a channel 828. This channel 828 carries signals 826 and can be implemented using wire or cable, fiber optics, a phone line, a cellular phone link, an RF link and other communications channels.

In this document, the terms "computer program medium" and "computer usable medium" are used to generally refer to media such as removable storage device 812, a hard disk installed in hard disk drive 810, and signals 826. These computer program products are means for providing software to computer system 801.

Computer programs (also called computer control logic) are stored in main memory and/or secondary memory 808. Computer programs can also be received via communications interface 824. Such computer programs, when executed, enable the computer system 801 to perform the features of the present invention as discussed herein. In particular, the computer programs, when executed, enable the processor 804 to perform the features of the present invention. Accordingly, such computer programs represent controllers of the computer system 801.

In an embodiment where the invention is implemented using software, the software may be stored in a computer program product and loaded into computer system 801 using removable storage drive 812, hard drive 810 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for determining whether to replicate a requested memory page for a requesting node in a non-uniform memory access (NUMA) computer system having a plurality of nodes, each node comprising one or more processors and a plurality of memory pages, and wherein any one of said processors from any one of said plurality of nodes can access any one of said memory pages from any of one of said plurality of nodes, the method comprising the steps of:

determining whether a physical memory page exists for the requested memory page;

ascertaining a coverage radius associated with said physical memory page, when said physical memory page exists; and creating a replica when the topological distance between said requesting node and said physical memory page is greater than said coverage radius;

wherein said ascertaining step comprises the step of:

calculating a new coverage radius from a current coverage radius according to $CR_n = CR_c + \phi(\text{memory pressure})$ wherein $CR_n$ is the new coverage radius, $CR_c$ is the current coverage radius, memory pressure indicates the available memory in the NUMA computer system, and $\phi(\text{memory pressure})$ is a function that depends on memory pressure and increases as memory pressure exceeds a predetermined threshold value;

whereby the coverage radius is dynamically adjusted.

2. The method of claim 1, wherein said step of creating a replica comprises the steps of:

allocating a new memory page, located in a node such that the topological distance between the requesting node and said replica is less than or equal to said coverage radius; and copying said requested memory page to said new memory page.

3. The method of claim 1, wherein the NUMA computer system further comprises a memory object associated with the requested memory page, said method further comprising the steps of:

interrogating the memory object for a page entry to determine whether said physical memory page exists; and interrogating the memory object to ascertain said coverage radius.

4. A method for determining whether to replicate a requested memory page for a requesting node in a non-uniform memory access (NUMA) computer system having a plurality of nodes, each node comprising one or more processors and a plurality of memory pages, and wherein any one of said processors from any one of said plurality of nodes can access any one of said memory pages from any of one of said plurality of nodes, the method comprising the steps of:

determining whether a physical memory page exists for the requested memory page;

ascertaining a coverage radius associated with said physical memory page, when said physical memory page exists; and creating a replica when the topological distance between said requesting node and said physical memory page is greater than said coverage radius;

wherein said ascertaining step comprises the step of:

calculating a new coverage radius from a current coverage radius according to $CR_n = CR_c - \beta(NT) + \phi$(memory pressure), wherein $CR_n$ is the new coverage radius, $CR_c$ is the current coverage radius, NT is a number of threads referencing the physical memory page, $\beta(NT)$ is a function that depends on NT and increases as NT exceeds a predetermined threshold value, memory pressure indicates available memory in the NUMA computer system, and $\phi$(memory pressure) is a function that depends on memory pressure and increases as memory pressure goes below a predetermined threshold value;

whereby the coverage radius is dynamically adjusted.

5. A method for controlling the degree of replication associated with a process for replicating a requested memory page in a non-uniform memory access (NUMA) computer system comprising a plurality of processors executing a plurality of threads, the NUMA computer system further comprising main memory represented by a plurality of memory objects, the method comprising the steps of:

maintaining a coverage radius associated with each of the plurality of memory objects, wherein the degree of replication for each of the plurality of memory objects is inversely proportional to the coverage radius; and calculating a new coverage radius from a current coverage radius according to $CR_n = CR_c + \phi$(memory pressure), wherein $CR_n$ is the new coverage radius, $CR_c$ is the current coverage radius, memory pressure indicates the available memory in the NUMA computer system, and $\phi$(memory pressure) is a function that depends on memory pressure and increases as memory pressure exceeds a predetermined threshold value, thereby decreasing the degree of replication for the NUMA computer system to conserve memory.

6. The method of claim 5, wherein said process for replicating a requested memory page comprises the steps of:

replicating said requested memory page for a requesting node when the topological distance between said requesting node and said requested memory page is greater than said coverage radius; and sharing said requested memory page with said requesting node when the topological distance between said requesting node and said requested memory pages is less than or equal to said coverage radius.

7. A method for controlling the degree of replication associated with a process for replicating a requested memory page in a non-uniform memory access (NUMA) computer system comprising a plurality of processors executing a plurality of threads, the NUMA computer system further comprising main memory represented by a plurality of memory objects, the method comprising the steps of:

maintaining a coverage radius associated with each of the plurality of memory objects, wherein the degree of replication for each of the plurality of memory objects is inversely proportional to the coverage radius;

maintaining a count associated with each of the plurality of memory objects, the count comprising a number of threads referencing each of the plurality of memory objects;

calculating a new coverage radius from a current coverage radius according to $CR_n = CR_c - \beta(NT) + \phi$(memory pressure), wherein $CR_n$ is the new coverage radius, $CR_c$ is the current coverage radius, NT is a number of threads referencing the physical memory page, $\beta(NT)$ is a function that depends on NT and increases as NT exceeds a predetermined threshold value, memory pressure indicates available memory in the NUMA computer system and $\phi$(memory pressure) is a function that depends on memory pressure and increases as memory pressure exceeds a predetermined threshold value thereby increasing the degree of replication associated with the particular memory object to avoid hotspots and decreasing the degree of replication for the NUMA computer system to conserve memory.

8. The method of claim 7, wherein said process for replicating a requested memory page comprises the steps of:

replicating said requested memory page for a requesting node if the topological distance between said requesting node and said requested memory page is greater than said coverage radius; and sharing said requested memory page with said requesting node if the topological distance between said requesting node and said requested memory pages is less than or equal to said coverage radius.

9. A system for determining whether to replicate a requested memory page for a requesting node in a non-uniform memory access (NUMA) computer system having a plurality of nodes, each node comprising one or more processors and a plurality of memory pages, wherein any one of said processors from any one of said plurality of nodes can access any one of said memory pages from any of one of said plurality of nodes, the system comprising:

means for determining whether a physical memory page exists for the requested memory page;

means for ascertaining a coverage radius associated with said physical memory page when said physical memory page exists; and means for creating a replica when the topological distance between said requesting node and said physical memory page is greater than said coverage radius;

wherein said means for ascertaining comprises:

means for calculating a new coverage radius from a current coverage radius according to $CR_n = CR_c + \phi(\text{memory pressure})$, wherein
$CR_n$ is said new coverage radius,
$CR_c$ is said current coverage radius,
memory pressure indicates the available memory in the NUMA computer system, and
$\phi(\text{memory pressure})$ is a function that depends on memory pressure and increases as memory pressure exceeds a predetermined threshold value.

10. A system for determining whether to replicate a requested memory page for a requesting node in a non-uniform memory access (NUMA) computer system having a plurality of nodes, each node comprising one or more processors and a plurality of memory pages, wherein any one of said processors from any one of said plurality of nodes can access any one of said memory pages from any of one of said plurality of nodes, the system comprising:

means for determining whether a physical memory page exists for the requested memory page;

means for ascertaining a coverage radius associated with said physical memory page when said physical memory page exists; and means for creating a replica when the topological distance between said requesting node and said physical memory page is greater than said coverage radius;

wherein said means for ascertaining comprises:

means for calculating a new coverage radius from a current coverage radius according to $CR_n = CR_c - \beta(NT) + \phi(\text{memory pressure})$, wherein
$CR_n$ is said new coverage radius,
$CR_c$ is said current coverage radius,
NT is a number of threads referencing the physical memory page,
$\beta(NT)$ is a function that depends on NT and increases as NT exceeds a predetermined threshold value,
memory pressure indicates available memory in the NUMA computer system, and
$\phi(\text{memory pressure})$ is a function that depends on memory pressure and increases as memory pressure exceeds a predetermined threshold value.

11. The system of claim 10, wherein said means for creating a replica comprises:

means for allocating a new memory page, located in a node such that the topological distance between the requesting node and said replica is less than or equal to said coverage radius; and means for copying data from said requested memory page to said new memory page.

12. The system of claim 10, wherein the NUMA computer system further comprises a memory object associated with the requested memory page, the system further comprises:

means for interrogating the memory object for a page entry to determine whether said physical memory page exists; and means for interrogating the memory object to ascertain said coverage radius.

13. A system for controlling the degree of replication associated with a process for replicating a requested memory page in a non-uniform memory access (NUMA) computer system comprising a plurality of processors executing a plurality of threads, the NUMA computer system further comprising main memory represented by a plurality of memory objects, said system comprising:

means for maintaining a coverage radius associated with each of said plurality of memory objects, wherein said degree of replication for each of said plurality of memory objects is inversely proportional to said coverage radius; and means for calculating a new coverage radius from a current coverage radius according to $CR_n = CR_c + \phi(\text{memory pressure})$, wherein
$CR_n$ is said new coverage radius,
$CR_c$ is said current coverage radius,
memory pressure indicates the available memory in the NUMA computer system, and
$\phi(\text{memory pressure})$ is a function that depends on memory pressure and increases as memory pressure exceeds a predetermined threshold value, thereby decreasing the degree of replication for the NUMA computer system to conserve memory.

14. A system for controlling the degree of replication associated with a process for replicating a requested memory page in a non-uniform memory access (NUMA) computer system comprising a plurality of processors executing a plurality of threads, the NUMA computer system further comprising main memory represented by a plurality of memory objects, the system comprising:

means for maintaining a coverage radius associated with each of said plurality of memory objects, wherein said degree of replication for each of said plurality of memory objects is inversely proportional to said coverage radius;

means for maintaining a count associated with each of said plurality of memory objects, said count comprising a number of threads referencing each of said plurality of memory objects;

means for calculating a new coverage radius from a current coverage radius according to $CR_n = CR_c - \beta(NT) + \phi(\text{memory pressure})$, wherein
$CR_n$ is said new coverage radius,
$CR_c$ is said current coverage radius,
NT is a number of threads referencing the physical memory page,
$\beta(NT)$ is said count,
memory pressure indicates available memory in the NUMA computer system, and
$\phi(\text{memory pressure})$ is a function that depends on memory pressure and increases as memory pressure exceeds a predetermined threshold value, thereby increasing the degree of replication associated with said particular memory object to avoid hotspots and decreasing the degree of replication for the NUMA computer system to conserve memory.

15. A computer program product comprising a computer useable medium having computer program logic stored therein, said computer program logic for enabling a computer to determine whether to replicate a requested memory page for a requesting node in a non-uniform memory access (NUMA) computer system having a plurality of nodes, each node comprising one or more processors and a plurality of memory pages, wherein any one of said processors from any one of said plurality of nodes can access any one of said memory pages from any of one of said plurality of nodes, wherein said computer program logic comprises:

means for enabling the computer to determine whether a physical memory page exists for the requested memory page;

means for enabling the computer to ascertain a coverage radius associated with said physical memory page when said physical memory page exists; and means for enabling the computer to for create a replica when the topological distance between said requesting node and said physical memory page is greater than said coverage radius;

wherein said means for enabling the computer to ascertain comprises:
  means for enabling the computer to calculate a new coverage radius from a current coverage radius according to $CR_n = CR_c + \phi(\text{memory pressure})$, wherein
    $CR_n$ is said new coverage radius,
    $CR_c$ is said current coverage radius,
    memory pressure indicates the available memory in the NUMA computer system, and
    $\phi(\text{memory pressure})$ is a function that depends on memory pressure and increases as memory pressure exceeds a predetermined threshold value.

16. The computer program product of claim 15, wherein said means for enabling the computer to create a replica comprises:
  means for enabling the computer to allocate a new memory page, located in a node such that the topological distance between the requesting node and said replica is less than or equal to said coverage radius; and
  means for enabling the computer to copy data from said requested memory page to said new memory page.

17. The computer program product of claim 15, wherein the NUMA computer system further comprises a memory object associated with the requested memory page, said computer program logic further comprises:
  means for enabling the computer to interrogate the memory object for a page entry to determine whether said physical memory page exists; and
  means for enabling the computer to interrogate the memory object to ascertain said coverage radius.

18. A computer program product comprising a computer useable medium having computer program logic stored therein, said computer program logic for enabling a computer to determine whether to replicate a requested memory page for a requesting node in a non-uniform memory access (NUMA) computer system having a plurality of nodes, each node comprising one or more processors and a plurality of memory pages, wherein any one of said processors from any one of said plurality of nodes can access any one of said memory pages from any of one of said plurality of nodes, wherein said computer program logic comprises:
  means for enabling the computer to determine whether a physical memory page exists for the requested memory page;
  means for enabling the computer to ascertain a coverage radius associated with said physical memory page when said physical memory page exists; and
  means for enabling the computer to for create a replica when the topological distance between said requesting node and said physical memory page is greater than said coverage radius;
  wherein said means for enabling the computer to ascertain comprises:
    means for enabling the computer to calculate a new coverage radius from a current coverage radius according to $CR_n = CR_c - \beta(NT) + \phi(\text{memory pressure})$, wherein
      $CR_n$ is said new coverage radius,
      $CR_c$ is said current coverage radius,
      NT is a number of threads referencing the physical memory page,
      $\beta(NT)$ is a function that depends on NT and increases as NT exceeds a predetermined threshold value,
      memory pressure indicates available memory in the NUMA computer system, and
      $\phi(\text{memory pressure})$ is a function that depends on memory pressure and increases as memory pressure goes below a predetermined threshold value.

19. A computer program product comprising a computer useable medium having computer program logic stored therein, said computer program logic for controlling the degree of replication associated with a process for replicating a requested memory page in a non-uniform memory access (NUMA) computer system comprising a plurality of processors executing a plurality of threads, the NUMA computer system further comprising main memory represented by a plurality of memory objects, said computer program logic comprising:
  means for enabling the computer to maintain a coverage radius associated with each of said plurality of memory objects, wherein said degree of replication for each of said plurality of memory objects is inversely proportional to said coverage radius; and
  means for enabling the computer to calculate a new coverage radius from a current coverage radius according to $CR_n = CR_c + \phi(\text{memory pressure})$, wherein
    $CR_n$ is said new coverage radius,
    $CR_c$ is said current coverage radius,
    memory pressure indicates the available memory in the NUMA computer system, and
    $\phi(\text{memory pressure})$ is a function that depends on memory pressure and increases as memory pressure exceeds a predetermined threshold value,
thereby decreasing the degree of replication for the NUMA computer system to conserve memory.

20. A computer program product comprising a computer useable medium having computer program logic stored therein, said computer program logic for controlling the degree of replication associated with a process for replicating a requested memory page in a non-uniform memory access (NUMA) computer system comprising a plurality of processors executing a plurality of threads, the NUMA computer system further comprising main memory represented by a plurality of memory objects, the computer program logic comprising:
  means for enabling the computer to maintain a coverage radius associated with each of said plurality of memory objects, wherein said degree of replication for each of said plurality of memory objects is inversely proportional to said coverage radius;
  means for enabling the computer to maintain a count associated with each of said plurality of memory objects, said count comprising a number of threads referencing each of said plurality of memory objects;
  means for enabling the computer to calculate a new coverage radius from a current coverage radius according to the function $CR_n(CR_c, \beta(NT), \phi(\text{memory pressure}))$, wherein $CR_n$ is dependent on $CR_c$, $\beta(NT)$, and $\phi(\text{memory pressure})$, and wherein
    $CR_n$ is said new coverage radius,
    $CR_c$ is said current coverage radius,
    NT is said count,
    $\beta(NT)$ is a function that depends on NT,
    memory pressure indicates the available memory in the NUMA computer system, and
    $\phi(\text{memory pressure})$ is a function that depends on memory pressure,
thereby increasing the degree of replication associated with said particular memory object to avoid hotspots and decreasing the degree of replication for the NUMA computer system to conserve memory.

* * * * *